US011938492B2

(12) United States Patent
Alden

(10) Patent No.: US 11,938,492 B2
(45) Date of Patent: Mar. 26, 2024

(54) MICRODROPLET NOZZLE

(71) Applicant: BILLERICAY FARM SERVICES LIMITED, Billericay (GB)

(72) Inventor: Jeremy Boyd Alden, Essex (GB)

(73) Assignee: Billericay Farm Services Limited, Billercay (GB)

( * ) Notice: Subject to any disclaimer, the term of this patent is extended or adjusted under 35 U.S.C. 154(b) by 358 days.

(21) Appl. No.: 17/278,490

(22) PCT Filed: Sep. 6, 2019

(86) PCT No.: PCT/GB2019/052492
§ 371 (c)(1),
(2) Date: Mar. 22, 2021

(87) PCT Pub. No.: WO2020/058667
PCT Pub. Date: Mar. 26, 2020

(65) Prior Publication Data

US 2022/0023893 A1 Jan. 27, 2022

(30) Foreign Application Priority Data

Sep. 20, 2018 (GB) ..................................... 1815323

(51) Int. Cl.
*B05B 1/14* (2006.01)

(52) U.S. Cl.
CPC ..................................... *B05B 1/14* (2013.01)

(58) Field of Classification Search
CPC .............. B05B 1/14; B05B 1/04; B05B 1/044
USPC .... 239/548, 552, 553, 553.5, 555, 568, 597, 239/598
See application file for complete search history.

(56) References Cited

U.S. PATENT DOCUMENTS 4,290,982 A * 9/1981 Bauman ............... A61H 33/025 239/555
4,339,081 A * 7/1982 Lindqvist ................ B05B 1/185 239/552
5,518,183 A 5/1996 Waldrum
5,803,371 A 9/1998 Sugiyama
5,823,436 A 10/1998 Waldrum
(Continued)

FOREIGN PATENT DOCUMENTS

GB 2271301 A 4/1994
JP H06226148 A 8/1994
JP 2002067327 A1 3/2002

OTHER PUBLICATIONS

Ghasem G Nasr, Andrew J Yule, Lothar Bending Ed-Nasr G G et al: “Chapter 2. Background on Sprays and Their Production”, Jan. 1, 2002 (Jan. 1, 2002), Industrial Sprays and Atomization: Design, Analysis and Applications, Springer, London, pp. 7-33, XP009195118, ISBN:978-1-4471-3816-7, Cited in ISR.

*Primary Examiner* — Steven J Ganey
(74) *Attorney, Agent, or Firm* — Renner, Kenner, Greive, Bobak, Taylor & Weber Co. LPA

(57) ABSTRACT

A nozzle for forming a spray pattern of micro droplets. The nozzle comprises a flow member having at least one face and a plurality of discrete grooves formed in the at least one face. One or more cover member is located over the face to cover the grooves so as to define a series of discrete channels. Each channel has a fluid inlet end that receives liquid to be sprayed and a fluid outlet end from which microdroplets are emitted.

18 Claims, 5 Drawing Sheets

(56) References Cited

U.S. PATENT DOCUMENTS

| | | | | |
|---|---|---|---|---|
| 6,102,306 | A * | 8/2000 | Ask | E01H 10/005 239/548 |
| 7,246,615 | B2 * | 7/2007 | Bartels | F15C 1/22 239/553 |
| 2004/0164189 | A1 | 8/2004 | Berning | |
| 2018/0194504 | A1 | 7/2018 | Franca | |

* cited by examiner

MICRODROPLET NOZZLE

This invention relates to a nozzle for forming a controlled spray pattern of microdroplets.

The invention has a particular benefit for use in agricultural spraying and an emphasis has been placed herein on such use, though it will be appreciated that the nozzle may be suitable for use in other industries and amenities, for example in horticulture.

In agriculture, regular crop spraying with pesticides and herbicides is essential to reduce the occurrence of insect pests, weeds and disease thereby to maintain high yields and good quality produce. The spraying can be done at any scale from manually with small hand pumped or battery driven hand held sprayers to a larger scale by self-propelled spraying machines with powered pumps and multiple spray nozzles mounted on booms. The sprays used are usually water based with the addition of organic pesticides or herbicides.

The size of the spray droplets is a major factor in the effectiveness of the spray. For a given spray volume, large droplets will leave gaps between each droplet as they hit the target and very small droplets will be carried away by air currents. For crop spraying most of the spray volume will be made up of droplets with a diameter in the range of 100 to 500 μm.

Recently, initiatives have been proposed to reduce the amount of environmental contamination as a result of spray drift and liquid runoff. It is anticipated that licencing of crop protection products in the future will depend on a greater percentage of active ingredients reaching the desired target. These environmentally driven proposals stipulate that only nozzles with a Drift Reduction Index of 95% may be included in the licence. Additionally, the proposal requires a medium/course spray quality of between 100 to 3000 litres per hour at between 1 to 5 bars pressure and speed of between 6 to 16 kilometres per hour.

There is however a balance between reducing drift and producing droplets of the most effective size for the particular application.

There are a number of conflicting requirements for droplet size, and so a range of droplet sizes is often desirable. Small droplets provide the greatest area of coverage, and are usually the most effective, as they reduce cost because a minimum amount of pesticide is used. However, larger droplets have the benefit of minimal drift due to air currents, and therefore hit the target area with minimal contamination of nearby crops and surfaces resulting in minimal environmental impact. Large droplets will also progress further through thick crop foliage, and even to the ground as desired in some instances.

In practice, spraying in windless conditions is rare. Even if there is no wind, air currents are caused by the movement of the spraying equipment, particularly when using self-propelled sprayers, which may travel at 15 kph or more. Different types of spray nozzle produce different spray volumes and should produce most of their spray volume within a specific droplet size range. A spectrum of droplet sizes is important and should determine the choice of nozzle and operating procedure to suit the relevant application and environmental conditions. For example, rotating disc sprayers can produce droplets of uniform size and this would be ideal if the target were a flat plate. However, where the target is foliage a range of droplet sizes has been found to give a more complete coverage.

The present invention seeks to address at least some of the problems associated with conventional nozzles, and in particular to produce a nozzle which seeks to address the problems of spray drift without the need to compromise on droplet size.

According to the present invention there is provided, a nozzle for forming a spray pattern of microdroplets, the nozzle comprising a flow member having at least one face, a plurality of discrete grooves formed in the at least one face; one or more cover member located over the face to cover the grooves so as to define a series of discrete channels, each channel having a fluid inlet end that receives liquid to be sprayed and a fluid outlet end from which microdroplets are emitted.

The term microdroplets is used herein to refer to extremely small droplets, preferably with a diameter between 50 and 1000 micrometres. The term "spray pattern of microdroplets" is intended to refer to a pattern formed by distinct streams of droplets. Conventionally, nozzles are formed with a single orifice or with a series of orifices arranged to allow the droplets to impinge on each other, so that the liquid is emitted in a single stream; such a configuration is usually desirable as it creates atomized mists, or plumes of vapor. However, the present invention seeks to eliminate problems associated with fluid drift and thus such a configuration is not suitable. It has been discovered that the fluid outlet size is directly related to the droplet size. Preferably, the discrete grooves are linear and or may be configured in such a way that the microdroplets emitted from the fluid outlet end of each channel do not generally affect each other after discharge. The fluid outlet ends of the channels shall hereinafter be referred to as channel outlets.

Various configurations of nozzle may be available with different spacings between adjacent channel outlets, whereby a specific spray pattern of microdroplets may be achieved by selecting a nozzle with the outlet positional configuration most suitable for the intended use. Where a regular spray pattern is required, the channel outlets may be equidistantly spaced. The flow member is configured to facilitate the flow of liquid therethrough.

To retain the cover member against the flow member, the nozzle may further comprise an enclosure into which the flow member and cover are inserted. The enclosure may be a standard nozzle case, such as an ISO 8 mm cap, or may be specifically designed for suitability with other requirements. Alternatively, the cover member may be defined by an enclosure in which the flow member is inserted to cover the grooves, thereby defining the channels. In any event, the enclosure preferably does not impede or affect microdroplets emitted from the channel outlets. The size of the opening in the enclosure must be suitable to accommodate at least the flow member therein. The opening may correspond to the size of the flow member, or flow member and cover, to be inserted therein so as to provide a tight-fitting sealed assembly.

The shape of the flow member may differ depending on the purpose of the nozzle and the spray pattern to be achieved; for example, in an agricultural application, the standard types of nozzles available include flat fan, hollow cone or full cone deflector nozzles; the names reflect the shapes of these nozzles and the respective overall spray shape emitted. The flow member and/or nozzle of the present invention may be configured to produce the same overall spray shape as conventional nozzles, albeit with a distinct flow pattern of microdroplets, as hereinbefore defined. The flow member and/or at least one face thereof may be circular, annular, rectangular or even square in cross-section.

The at least one face of the flow member may be planar. In a preferred arrangement, the flow member has two faces. A plurality of discrete grooves may be formed in both faces. Ideally, the two faces are substantially parallel, thereby defining parallel linear arrays of channel outlets. The positioning of the channel outlets along each linear array and the position of channel outlets in adjacent linear arrays may be varied in order to achieve the desired overall spray pattern. The channel outlets of the array of one face may be aligned with corresponding channel outlets of the array formed in the other face. Preferably though to produce a more evenly distributed flow pattern, the channel outlets of one array are offset from the channel outlets of the adjacent array. The extent of offset depends on the spray pattern to be achieved. In a particularly preferred arrangement, the channel outlets of one linear array are staggered with respect to an adjacent array of outlets. This staggering may be regular. The channel outlets of each linear array may be equidistantly spaced. This configuration may be beneficial to produce an even spray pattern.

The flow member may be generally rectangular in cross section with grooves formed in opposite planar surfaces. Depending on the desired spray pattern a range of channel outlets may be required. The nozzle may include more than one flow member. More than one flow member effectively increases the possible number of channel outlets in the nozzle. Preferably, the flow members are configured to locate directly adjacent each other. In this arrangement, advantageously an adjacent flow member may define a cover member for channels in an adjacent flow member. Multiple layers of flow members may be provided and configured in any pattern to produce regular or unregular spray patterns.

The grooves may be formed by engraving, moulding, chemical etching or any other process suitable for forming small grooves. The grooves and/or the channel outlets may be any suitable shape, including circular, semi-circular, triangular in cross section. Preferably, the cross-section of each groove is uniform. The width of the respective grooves and/or the width of the channel outlets may be consistent. Preferably, the width of the respective grooves and/or the width of the channel outlets varies to provide a range of microdroplet sizes. Ideally, the grooves are configured to provide a narrow band of droplet sizes. The grooves may be sized to produce a range of droplets with a diameter between 50 and 1000 micrometres. Advantageously, such a narrow band of sizes has been shown to produce very few droplets of the size which can be lost to drift. The nozzle of the present invention may therefore produce droplets of various but precise sizes in a narrow band without the need for external stimuli; this has been shown to offer greater efficiency, particularly for use in agriculture and specifically when using crop protection products.

Naturally, the speed at which droplets are expelled from the nozzle has an influence on the performance of the nozzle and the ability to reduce the number of droplets lost to drift. The flow rate of the device may be set by the cross sectional area of the channels, the number of channels and the hydraulic pressure forcing the fluid through the nozzle. The flow rate can thus be adjusted depending on the desired spray pattern. Preferably, the flow rate is in the range 0.4 to 4 litres per minute. The number of channels defined in the, or each, flow member depends on the desired result; a single channel is of course possible as too are thousands of channels. In the most practical arrangement, it is envisaged that between 10 and 200 channels may be appropriate. The nozzle may be most suitable for use with a hydraulic pressure of between 1 and 5 bar, although the nozzle is capable of operating outside such limits, if necessary. The orientation of the grooves may be selected to define channels and channel outlets configured to produce any required spray pattern.

The nozzle may be used in conjunction with a filter in order to protect the nozzle from particles which could restrict fluid flow. The nozzle is preferably configured for use with standard nozzle filters. With conventional nozzles, the restriction of flow caused by a blockage will result in significant disruption of the flow pattern. Advantageously, the arrangement of the nozzle of the present invention is such that a blockage of one of the channels will affect only that channel outlet; in such an incidence, the overall spray pattern will not be adversely affected.

The nozzle may be formed from a corrosion resistant material, such as stainless steel or bronze. Preferably, the nozzle, or a part thereof is formed from plastic; more preferably, a plastic suitable for injection moulding for ease of manufacture.

An advantage of the nozzle of the present invention is that it is interchangeable in that a range of nozzles can be formed with different spray patterns simply by altering the flow members within the enclosure. The nozzle is therefore versatile.

In a closely related aspect of the present invention there is provided a method of forming a nozzle for delivering a spray pattern of microdroplets, the nozzle comprising one or more flow members, the or each flow member having at least one face, as described hereinbefore, the method comprising the steps of:

- forming a plurality of discrete grooves in the at least one face of the, or each flow member;
- locating a cover member over the said face to cover the grooves, thereby defining a series of discrete channels, each channel having a fluid inlet end that receives liquid to be sprayed and a fluid outlet end from which microdroplets are emitted; and
- inserting the, or each, flow member and cover into an enclosure to retain the cover member against the, or each, flow member.

Preferably, the nozzle is formed with more than one flow member layered against each other, with each flow member having one or more linear array of channel outputs. In this way, the nozzle is designed to produce a spray pattern with the same overall spray shape as a conventional nozzle but with a unique spray pattern.

In use, fluid is forced through the nozzle under hydraulic pressure. The nozzle may be used alone as part of a hand-held sprayer. Such a sprayer may be a backpack or knapsack sprayer or other portable spraying apparatus. Multiple nozzles may of course be provided on such a sprayer. Alternatively, the nozzle may be fitted to spray booms or carriages and arranged to emit spray bands or full width coverage. As a further alternative, the nozzle, or a plurality of nozzles may instead be incorporated in or provided as part of a sprayer on a drone or other autonomous vehicle, with such a sprayer being configured to operate under remote control.

According to another embodiment of the present invention, there is provided a spraying assembly comprising one or more nozzle as described with a fluid delivery system to provide fluid for spraying to the, or each, nozzle.

By way of example only, an embodiment of this invention will now be described in detail, reference being made to the accompanying drawings in which:—

FIG. 1*a* shows a first type of conventional flat fan nozzle in a standard nozzle attachment;

FIG. 1*b* shows a second type of conventional flat fan nozzle in a standard nozzle attachment;

FIG. 1*c* shows a nozzle according to the present invention in a standard nozzle attachment;

Figure 9A:
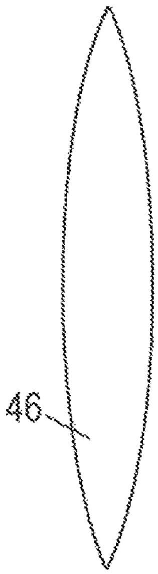
Figure 9B:
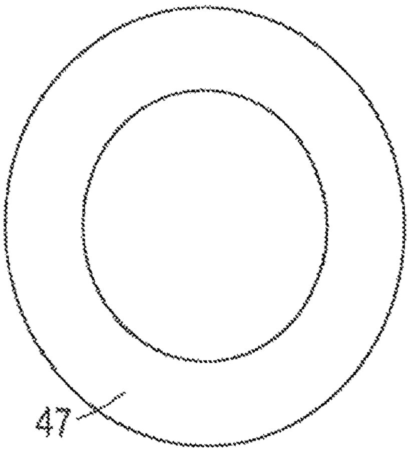
Figure 9C:
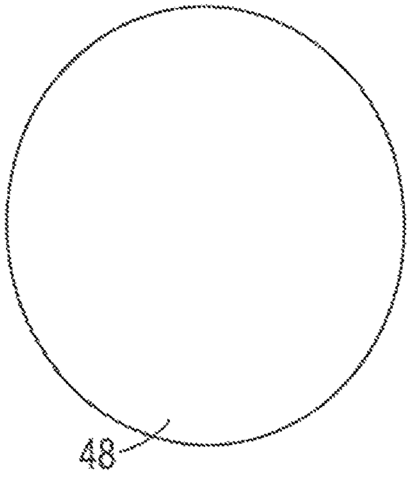
Figure 10:
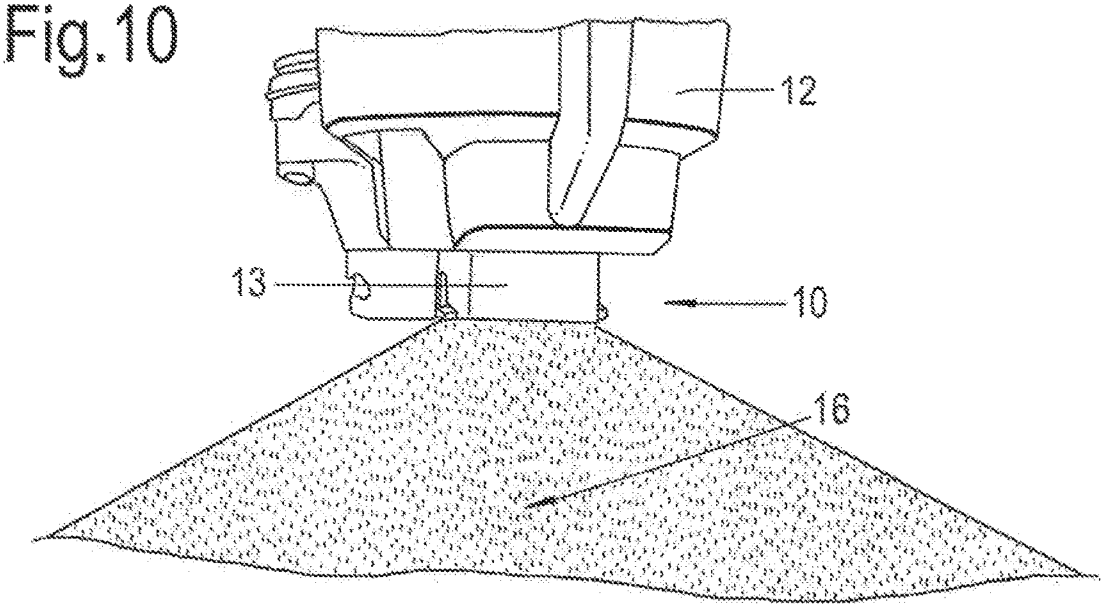
Figure 11:
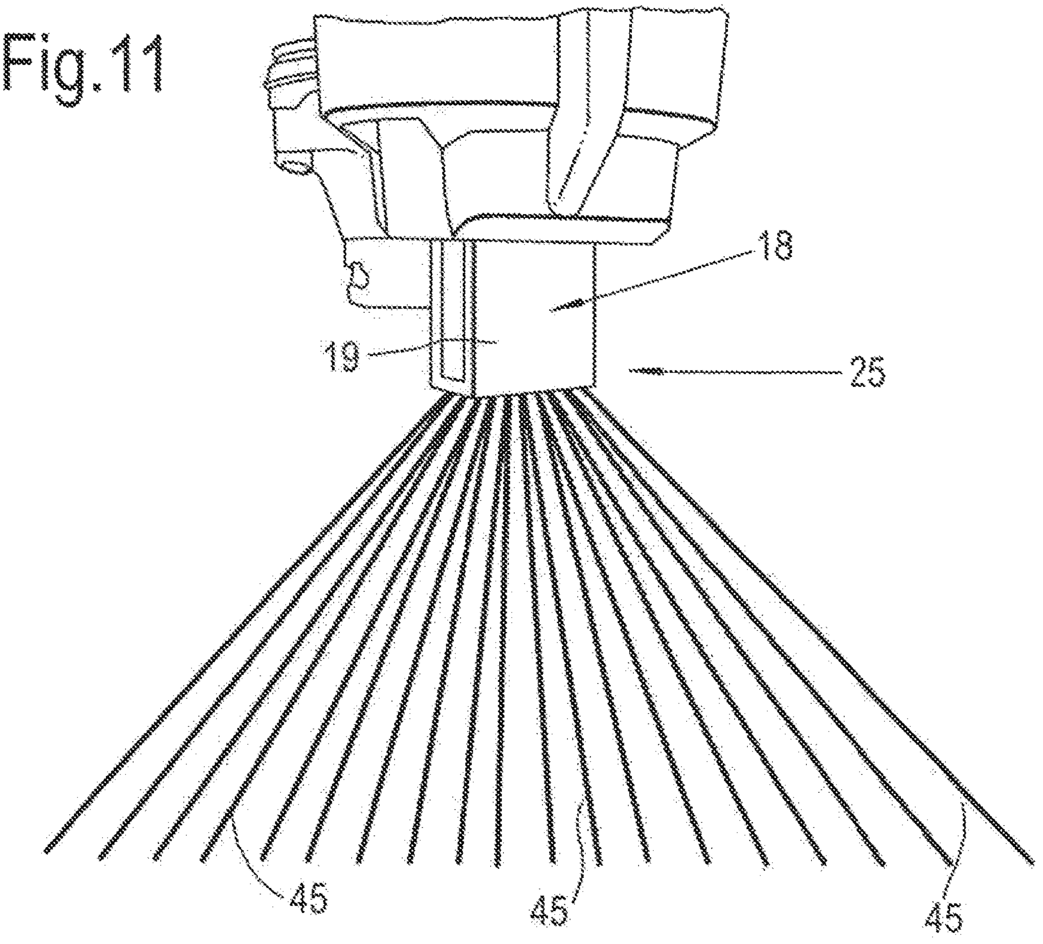

FIG. 9*a* shows a conventional flat fan nozzle spray shape;

FIG. 9*b* shows a conventional hollow cone nozzle spray shape;

FIG. 9*c* shows a conventional full cone nozzle spray shape;

FIG. 10 shows the spray pattern shape of a conventional flat fan nozzle in use; and FIG. 11 shows the spray pattern of microdroplets formed by the nozzle of the present invention, in use.

Figure 1A:
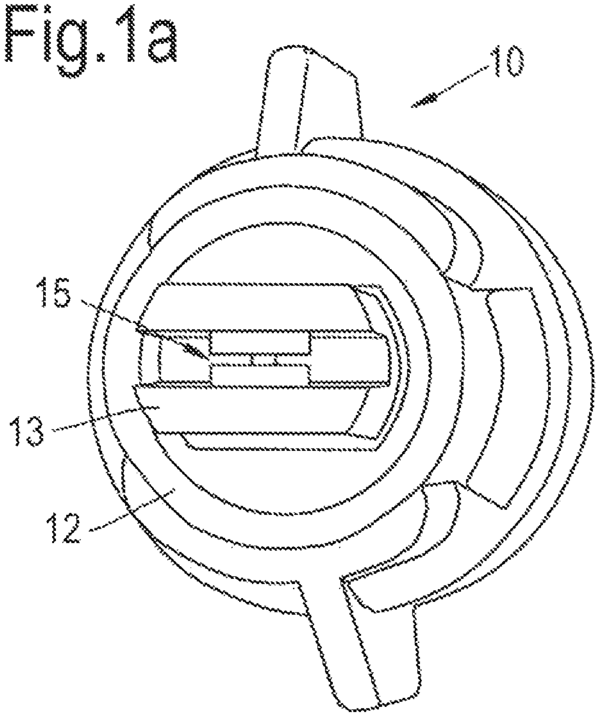
Figure 1B:
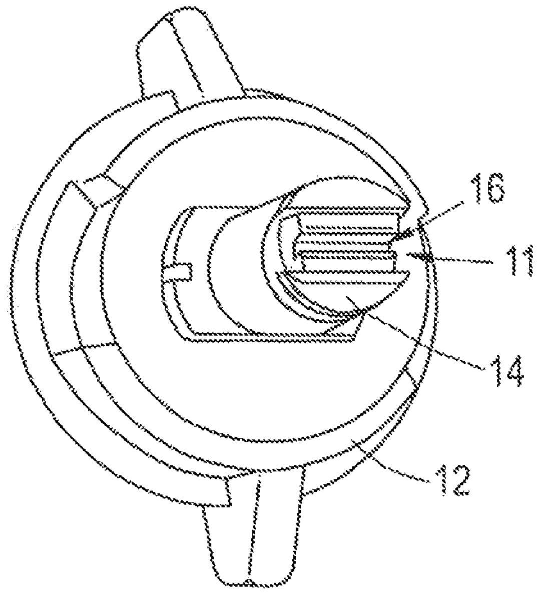

Referring initially to FIGS. 1*a* and 1*b*, there are shown two conventional nozzles 10, 11, each located in a standard nozzle attachment 12. Both nozzles 10, 11 include an enclosure 13, 14 defining a single orifice 15, 16 for liquid to be emitted. The orifice 15 in the nozzle 10 of FIG. 1*a* is smaller than that of FIG. 1*b* but both are designed to emit a spray pattern which appears as a flat sheet of liquid 16, as shown in FIG. 10. In both of these conventional nozzles, as liquid is emitted from the nozzle orifice 15, 16 it forms into droplets with a large variation of sizes. As the pressure forcing the liquid through the orifice increases the droplet size tends to decrease. As these nozzles 10, 11, along with the nozzle attachment are standard, the configuration is not discussed in detail.

Figure 1C:
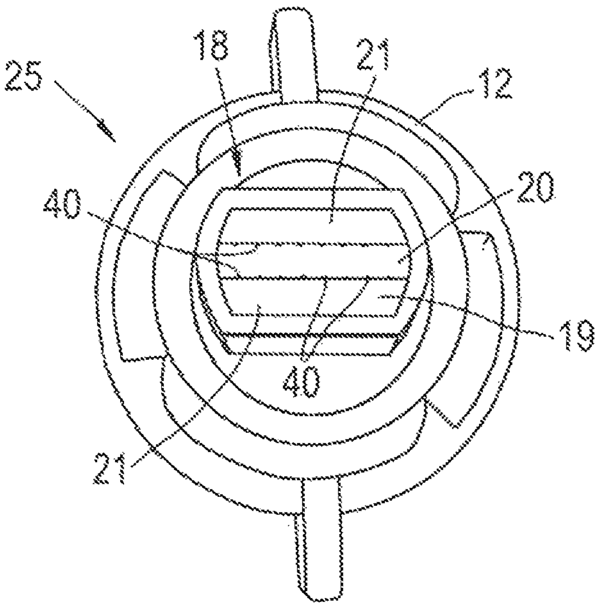
Figure 2:
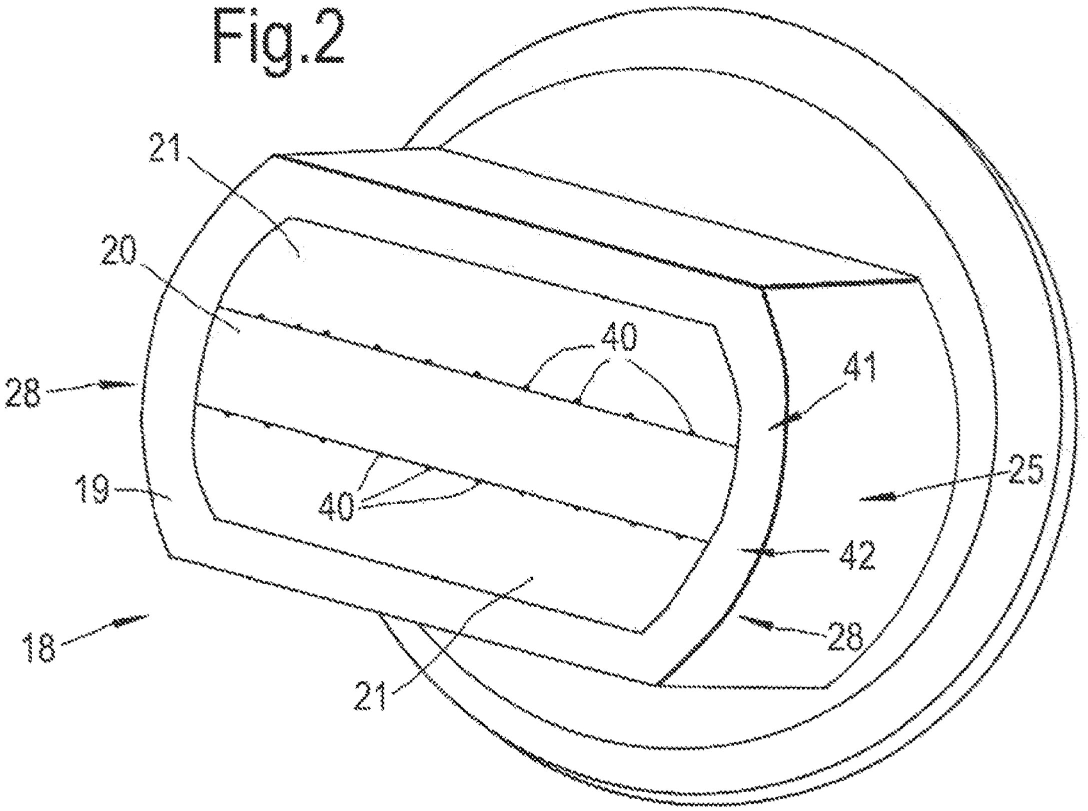
FIG. 2 shows the nozzle of FIG. 1*c* in more detail.

The nozzle 18 of the present invention is best illustrated in FIGS. 1*c* and 2. The nozzle 18 includes an enclosure 19 which is generally hollow, and in which a flow member 20 and two covers 21 are located, as described in more detail below. As can be seen in FIGS. 1*c* and 5 to 8, the enclosure includes an upper portion 25 which, in use, extends from a nozzle attachment 12 and a lower portion 26, which is designed to engage in the attachment 12. The lower portion 26 includes a circular flange 27 to facilitate engagement with the nozzle attachment 12. The overall outer shape of the nozzle enclosure 19 is the same as the conventional nozzles illustrated in FIGS. 1*a* and 1*b*; this ensures it is compatible with conventional nozzle attachments 12. The upper portion 25 of the enclosure is generally rectangular in cross-section but having curved edges 28 on the two opposite end portions.

Figure 3:
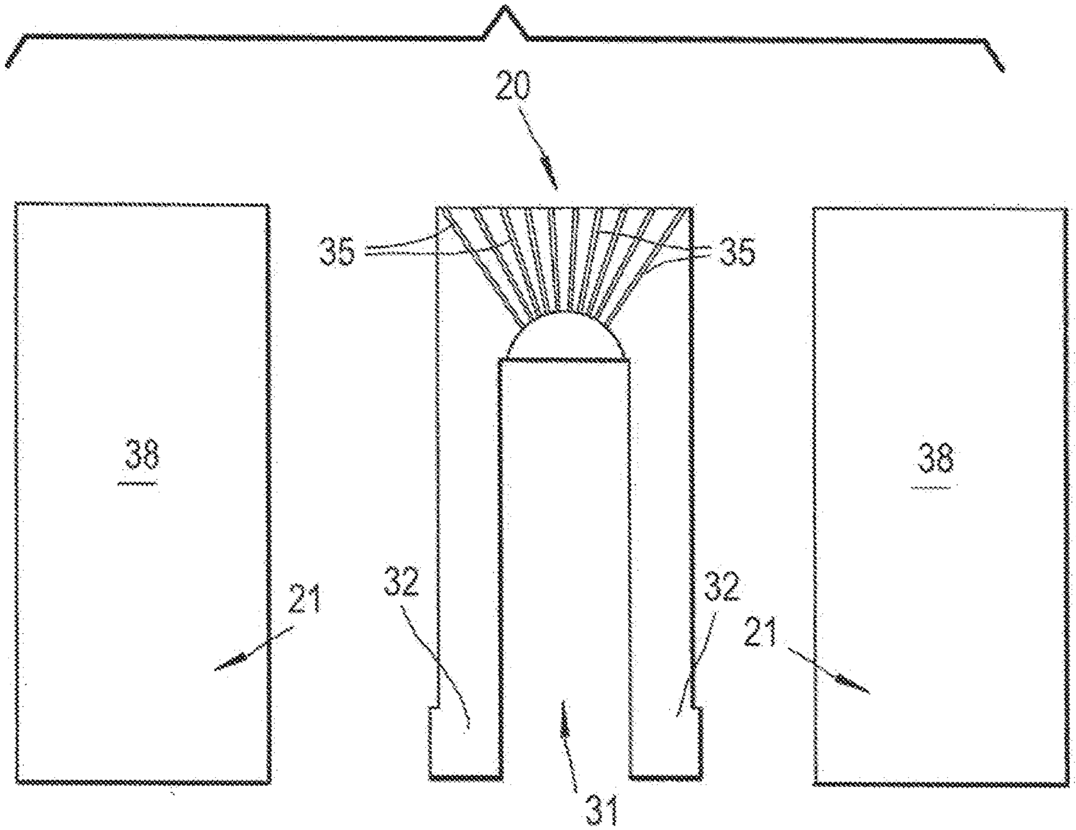
FIG. 3 is an exploded view of the inner components of the nozzle of FIGS. 1*c* and 2.
Figure 4:
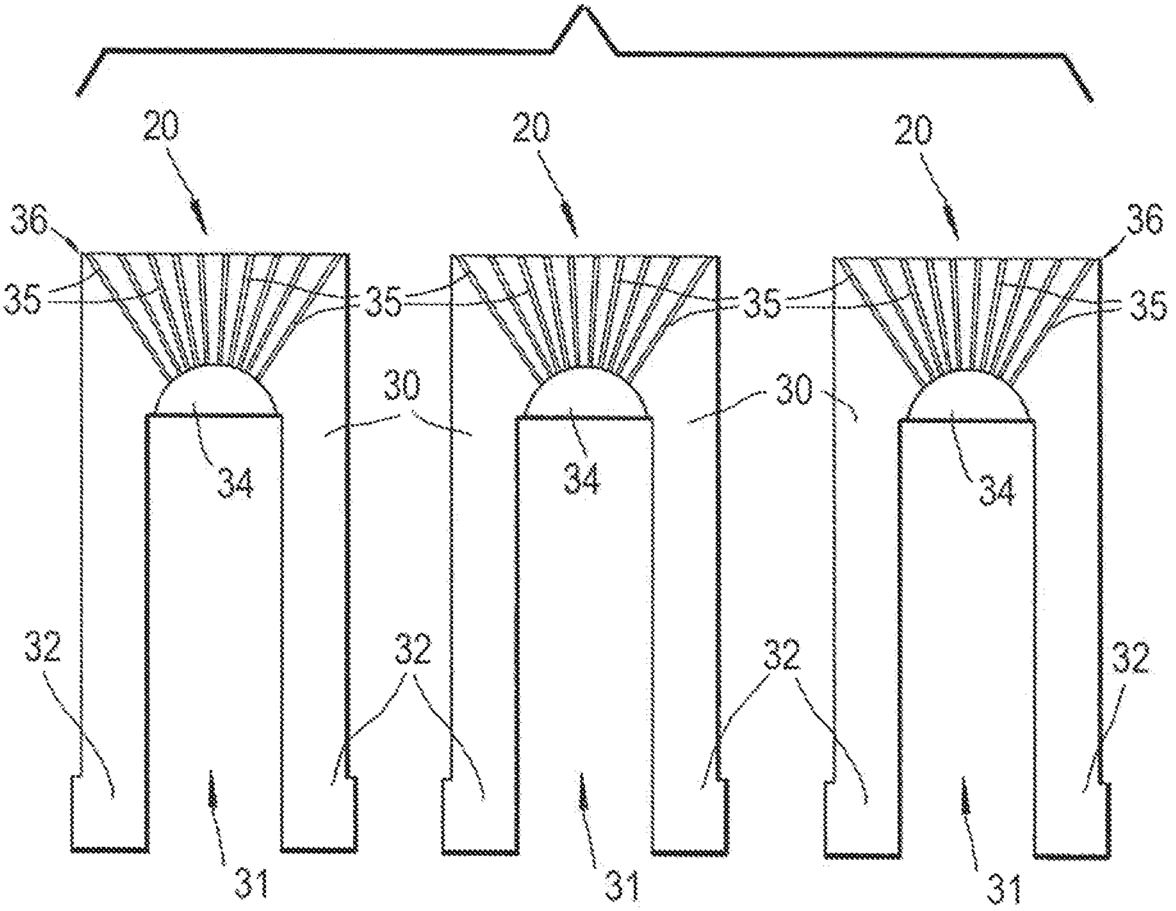
FIG. 4 is an exploded view of the inner components of an alternative arrangement of nozzle of the present invention.
Figure 5:
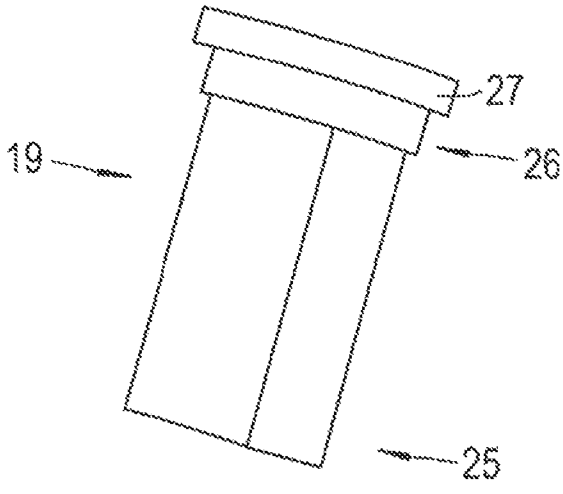
FIG. 5 is a side view of the enclosure of the nozzle of the present invention.
Figure 6:
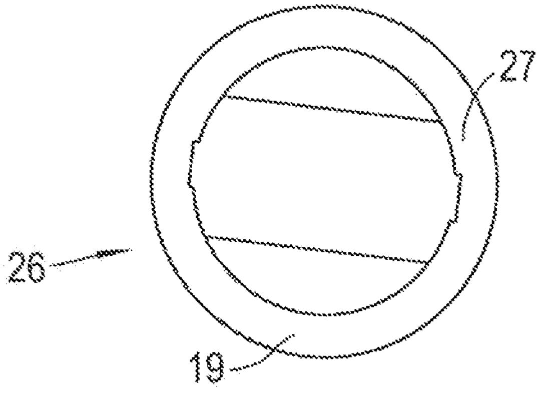
FIG. 6 is a rear view of the enclosure of FIG. 5.
Figure 7:
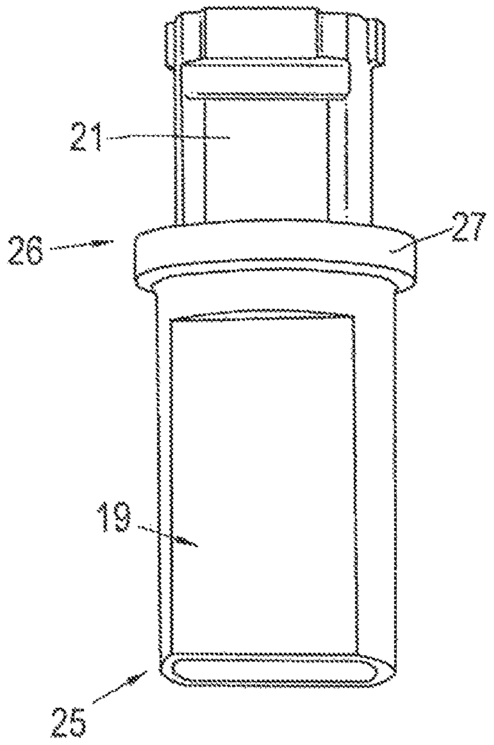
FIG. 7 is a view of the inner components of the nozzle being inserted into the enclosure of FIGS. 5 and 6.
Figure 8:
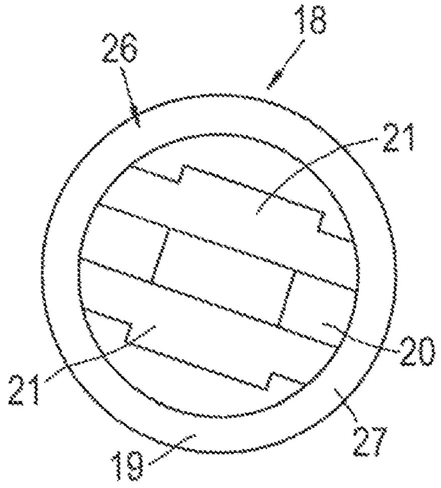
FIG. 8 is a rear view of an assembled nozzle.

The flow member 20 of the nozzle 18 may be a single plate, as illustrated in FIG. 3 or may comprise multiple plates arranged to overlay each other to form a series of layers of flow members 20. Each flow member 20 illustrated is essentially formed from a rectangular plate having two generally planar faces 30 and an opening 31 through one end thus defining two legs 32 in a bifurcated configuration. Whilst only one side of the flow members 20 can be seen in FIGS. 3 and 4, it should be appreciated that the opposite side is substantially identical. The opening 31 leads to a semi-circular recess 34 formed in both faces 30 of the plate. A series of distinct grooves 35 extend from the recess 34, along each face 30 and to the upper edge 36 of the plate. The grooves 35 illustrated have different widths but are equally spaced.

As shown in FIGS. 1*c*, 2 and 3, two covers 21 are provided in the assembled nozzle illustrated and these are arranged to locate over the faces 30 of the flow member. Each cover 21 comprises a plate having a generally rectangular face 38 arranged to lie against the flow member 20 and a semi-circular outer profile corresponding to the inner profiled of the enclosure. The covers 21 are designed to cover the grooves 35 and thereby define a series of discrete channels. At the upper edge 36 of a flow member 20 these channels define outlets 40 for fluid to be emitted from the nozzle 18. These outlets 40 form two linear arrays 41, 42, spaced in a regular pattern. The outlets 40 of the arrays 41 of one of the faces of the flow member are offset in a staggered configuration from the outlets 40 of the arrays 42 of the other faces; this may assist to produce an evenly distributed flow pattern. As best seen in FIGS. 1*c* and 2, when assembled, the flow members 20, cover 21 and enclosure 19 are generally flush at the upper edge 36, thereby forming a planar nozzle outlet end.

More than one flow member 21 may be provided in the nozzle 18 to increase the number of outlets 40 and/or to change the shape of the spray pattern. In this arrangement adjacent flow members 20 may serve also as a cover for the faces of adjacent flow members; in this arrangement, a regular staggered arrangement of adjacent arrays 41, 42 of outlets 40 is preferred to facilitate such dual functionality (i.e. to enable adjacent flow members to locate over adjacent grooves and thus define separate channels). Three flow members 20 are shown in FIG. 3. In this configuration, whilst not illustrated, covers 38 may also be provided for the two outer flow members 20 of the group. Alternatively, the enclosure 19 may serve as a cover for the outer flow members.

The flow member, or members 20, and covers 21 (where provided) are arranged to locate within the hollow enclosure 19 in a tight fitting, sealed manner.

The arrangement of distinct channels 35 and arrays of channel outlets 40 produces a pattern formed by distinct streams of droplets 45. The discrete grooves 35 are configured in such a way that the microdroplets emitted from the outlet 40 of each channel do not generally affect each other.

The shape of the flow member 20 may differ depending on the purpose of the nozzle 18 and the spray pattern to be achieved. The main standard types of nozzles used in agricultural applications include flat fan 46 (see FIG. 9*a*), hollow cone 47 (see FIG. 9*b*) and full cone 48 (see FIG. 9*c*) deflector nozzles; the names reflect the shapes of these nozzles and the respective overall spray shape emitted. The flow member 20 and/or nozzle 18 of the present invention may be configured to produce the same overall spray shape as conventional nozzles.

The invention claimed is:

1. A nozzle (18) for use in agricultural spraying and for forming a spray pattern of micro droplets, the nozzle (18) comprising a flow member (20) having at least one face (30), a plurality of discrete grooves (35) formed in the at least one face (30); one or more cover member (21) located over the face (30) to cover the grooves (35) so as to define a series of discrete channels, each channel having a fluid inlet end that receives liquid to be sprayed and a fluid outlet end from which microdroplets are emitted and an enclosure (19) configured to retain the cover member (21) against the flow member (20), characterized in that the enclosure defines an opening to accommodate the flow member therein.

2. A nozzle (18) as claimed in claim 1, wherein the discrete grooves (35) are configured in such a way that the microdroplets emitted from the fluid outlet end (40) of each channel do not substantially affect each other.

3. A nozzle (18) as claimed in claim 2, wherein the discrete grooves (35) provided on the at least one face (30) of the flow member (20) are equidistantly spaced.

4. A nozzle (18) as claimed in claim 1, wherein the cover member (21) is defined by the enclosure (19) in which the flow member (20) is inserted to cover the grooves (35), thereby defining the channels.

5. A nozzle (18) as claimed in claim 1, wherein the at least one face (30) of the flow member (20) is planar.

6. A nozzle (18) as claimed in claim 1, wherein the flow member (20) has two faces (30).

7. A nozzle (18) as claimed in claim 6, wherein a plurality of discrete grooves (35) are formed in both faces (30) of the flow member (20).

8. A nozzle (18) as claimed in claim 7, wherein each channel fluid outlet end defines a channel outlet (40) and wherein the two faces (30) are substantially parallel, thereby defining parallel linear arrays of channel outlets (40).

9. A nozzle (18) as claimed in claim 8, wherein the channel outlets (40) of one array are offset from the channel outlets (40) of the adjacent array.

10. A nozzle (18) as claimed in claim 1, comprising more than one flow member (20).

11. A nozzle (18) as claimed in claim 10, wherein the flow members (20) are configured to locate directly adjacent each other.

12. A nozzle (18) as claimed in claim 11, wherein an adjacent flow member (20) defines a cover member (21) for channels in an adjacent flow member (20).

13. A nozzle (18) as claimed in claim 1, wherein the grooves (35) are circular or semi-circular in cross section.

14. A nozzle (18) as claimed in claim 1, wherein the cross-section of each groove (35) is uniform.

15. A nozzle (18) as claimed in claim 14, wherein the width of adjacent grooves (35) varies to provide a range of microdroplet sizes.

16. A nozzle (18) as claimed in claim 15, wherein the grooves (35) are sized to produce a range of droplets with a diameter between 50 and 1000 micrometres.

17. A spraying assembly comprising one or more nozzle (18) as described in claim 1, in combination with a fluid delivery system to provide fluid for spraying to the, or each, nozzle (18).

18. A method of forming a nozzle (18) for use in agricultural spraying and for delivering a spray pattern of microdroplets, the nozzle (18) comprising one or more flow members (20), the or each flow member (20) having at least one face (30), the method comprising the steps of:

forming a plurality of discrete grooves (35) in the at least one face (30) of the, or each flow member (20);

locating a cover member (21) over the said face (30) to cover the grooves (35), thereby defining a series of discrete channels, each channel having a fluid inlet end that receives liquid to be sprayed and a fluid outlet end from which microdroplets are emitted; and inserting the, or each, flow member (20) and cover member (21) into an enclosure (19) to retain the cover member (21) against the, or each, flow member (20), characterized in that the enclosure (19) includes an opening into which the flow member (20) and cover member (21) are inserted.

* * * * *